United States Patent [19]

Loser

[11] Patent Number: 4,609,023
[45] Date of Patent: Sep. 2, 1986

[54] PNEUMATIC TIRE WITH SIDEWALL INSERT

[75] Inventor: Robert P. Loser, Akron, Ohio

[73] Assignee: The Goodyear Tire & Rubber Company, Akron, Ohio

[21] Appl. No.: 683,825

[22] Filed: Dec. 19, 1984

[51] Int. Cl.⁴ .............................................. B60C 9/02
[52] U.S. Cl. ........:............................. 152/454; 152/541; 152/555
[58] Field of Search ............. 152/362 R, 362 CS, 374, 152/354 R, 454, 548, 549, 555, 541

[56] References Cited

U.S. PATENT DOCUMENTS

| | | |
|---|---|---|
| 3,301,303 | 1/1967 | Travers . |
| 3,464,477 | 9/1969 | Verdier . |
| 3,577,860 | 1/1971 | Maiocchi . |
| 3,717,190 | 2/1973 | Boileau . |
| 3,842,883 | 10/1974 | Masson et al. . |
| 3,964,533 | 6/1976 | Arimura et al. . |
| 4,067,372 | 1/1978 | Masson . |
| 4,085,787 | 4/1978 | Maiocchi . |
| 4,139,040 | 2/1979 | Samoto et al. . |
| 4,177,852 | 12/1979 | Merli et al. . |
| 4,193,937 | 3/1980 | Powell ................ 152/330 RF |
| 4,235,273 | 11/1980 | Edwards et al. . |
| 4,236,563 | 12/1980 | Moers et al. . |
| 4,261,405 | 4/1981 | Yamauchi et al. . |
| 4,265,288 | 5/1981 | Kaneko et al. ............. 152/330 RF |
| 4,285,381 | 8/1981 | Furukawa et al. ............. 152/362 R |
| 4,287,924 | 9/1981 | Deck et al. . |
| 4,365,659 | 12/1982 | Yoshida et al. . |

FOREIGN PATENT DOCUMENTS

| | | |
|---|---|---|
| 2516722 | 11/1975 | Fed. Rep. of Germany . |
| 1372638 | 11/1974 | United Kingdom . |
| 2033316 | 5/1980 | United Kingdom . |

*Primary Examiner*—Michael Ball
*Attorney, Agent, or Firm*—T. P. Lewandowski; Jay F. Moldovanyi

[57] ABSTRACT

A pneumatic tire (A) includes a body having a crown (10) with a ground-engaging tread portion (20), a pair of sidewall portions (12, 14), as well as a pair of bead portions (16, 18). An annular substantially inextensible bead reinforcing member (36) is positioned in each of the bead portions (16, 18). A carcass ply (30) is positioned in each sidewall (12, 14) and the crown (10) and extends from one of the bead portions (16) to the other of the bead portions (18). A first elastomer reinforcing member (50) is positioned in each bead portion (16, 18) and is disposed axially outwardly of the carcass ply (30) and adjacent the bead reinforcing member (36). A second elastomer reinforcing member (60) is positioned in each bead portion (16, 18) with at least a portion of the second member being disposed axially inwardly of the carcass ply (30) and extending radially outwardly from adjacent the bead reinforcing member (36).

20 Claims, 4 Drawing Figures

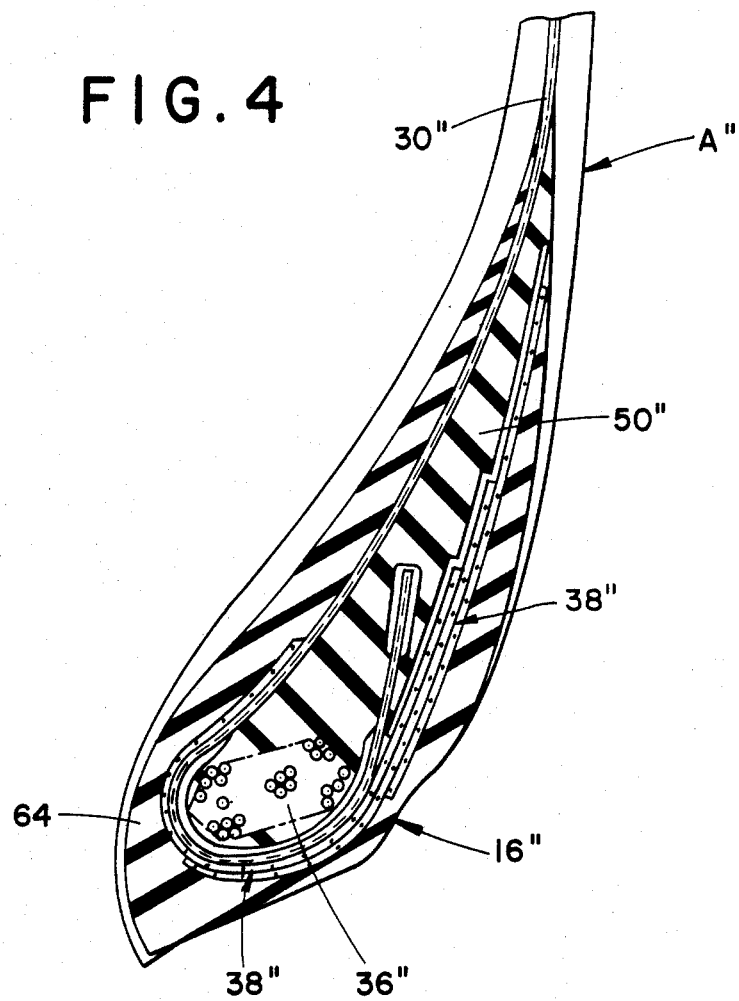

PNEUMATIC TIRE WITH SIDEWALL INSERT

This invention generally pertains to pneumatic tires. More specifically, the present invention relates to an elastomeric insert positioned axially inwardly of the carcass ply structure of the pneumatic tire to allow conformation of the ply structure to its natural shape when the tire is inflated.

The invention is prticularly applicable to tubeless truck tires having a radial carcass and will be described with particular reference thereto. However, it will be appreciated by those skilled in the art that the invention has broader applications and may also be adapted for use in other environments, such as low profile tires and the like.

In conventional tire constructions, the bead portions of the tires each contain at least one inextensible bead wire surmounted by a stiffener or filler strip of generally triangular cross section. One or more carcass plies are folded around this combination of bead wire and stiffener. The main function of the stiffener is to bring about a gradual transition in stiffness between the very stiff lower part of the tire sidewall and the thin, and flexible, upper part of the sidewall.

In conventional tubeless tire sidewalls, the stiffener is positioned axially outwardly of the carcass ply and only a liner ply is positioned inwardly of the carcass ply. When such a tire is inflated, however, the carcass ply does not conform to its natural shape due to the positioning the size of the stiffener. The tire's carcass ply is therefore placed under a strain when the tire is inflated. Such a strain, which can be termed an inflation induced strain or "inflation strain" for short, can be defined as the effect of a shape change of the cords of the carcass ply on the surrounding rubber of the tire. Such a strain is more than just a tension force on the carcass ply and can result in a deformation of the carcass ply cords. Reducing this inflation strain would be advantageous since it would enhance the tire's long-term durability. If the ply were of the correct shape upon inflation of the tire, then the inflation strain would be considerably reduced.

The inflation strain could also be reduced by decreasing the thickness of the stiffener or by making it from a softer compound, but this would increase the deflection strain on the tire since the tire sidewall would be less stiff and undergo more deflection.

Generaly, the gauge (i.e. width) and compound of the stiffener or filler strip are adjusted to control the road holding and road behavior of the tire as well as its ride properties. Thus, hard rubber stiffeners of considerable height (extending, for example, halfway up the sidewall) may be advantageous for good road behavior (ability to hold a straight line and rapid response to changes of direction).

It would be advantageous to maintain present tire sidewall gauges thus keeping the lateral stiffness of the tire the same while allowing the carcass ply to more closely conform to its natural shape upon inflation, thereby decreasing inflation strains on the tire while at the same time not exacerbating deflection strains.

Accordingly, it has been considered desirable to develop a new and improved pneumatic tire which would overcome the foregoing difficulties and meet the above-stated needs and others while providing better and more advantageous overall results.

For the purposes of this application, "radially" means a direction perpendicular to the tire's axis of rotation and "axially" means a direction parallel to such axis.

In accordance with the present invention, a new and improved pneumatic tire is provided in which the carcass ply is allowed to better conform to its natural shape when the tire is inflated.

More particularly in accordance with the invention, the pneumatic tire includes a body having a ground-engaging tread portion, a pair of sidewall portions and a pair of bead portions. An annular substantially inextensible bead reinforcing member is positioned in each of the bead portions. A carcass ply is positioned in the sidewalls and the ground-engaging tread portion and extends from one of the bead portions to the other of the bead portions. A first elastomer reinforcing member is disposed in each bead portion axially outwardly of the carcass ply. A second elastomer reinforcing member is positioned in each bead portion with at least a portion of the second member being disposed axially inwardly of the carcass ply and extending radially outwardly from adjacent the bead reinforcing member.

According to another aspect of the invention, a pneumatic tire is provided with a ground-engaging tread portion which extends about the circumference of the tire and merges into a sidewall portion of each lateral edge. The sidewall portions extend radially inwardly and each terminate in a bead portion. An annular substantially inextensible bead reinforcing member is positioned in each of the bead portions. A carcass ply extends from one of the bead portions to the other of the bead portions with lateral ends of the carcass ply extending around the pair of bead reinforcing members. A first elastomer reinforcing member is positioned in each bead portion and is disposed axially outwardly of the carcass ply and radially outwardly of the bead reinforcing member. A second elastomer reinforcing member is provided in each bead portion such that at least a portion of the second member is disposed axially inwardly of the carcass ply and extends from about the bead reinforcing member radially outwardly to a point spaced from the tire nominal rim diameter a distance no greater than approximately 65% of the tire section height.

A method of making a pneumatic tire includes providing a liner member having first and second edges and positioning a chafer member near each edge of the liner. An elastomeric sidewall reinforcing member is positioned near each of the liner edges adjacent a respective chafer. A carcass ply is positioned on the liner with opposing edges of the carcass ply overlying a respective elastomeric sidewall reinforcing member and a respective chafer. A pair of stiffener members are positioned atop the carcass ply, one adjacent each of the opposing edges thereof. Finally, an outer ply is positioned on the carcass structure with opposing edges of the outer ply overlying an edge of one of the chafer members.

An advantage of the present invention is the provision of an elastomeric insert positioned axially inwardly of the carcass ply to allow the conformation of the ply to its natural shape even when the tire is inflated thus improving the durability of the tire by reducing inflation caused strains thereon.

Another advantage of the invention is the provision of the elastomeric insert mentioned above to allow the gauge and/or compound of the tire sidewall to be changed without increasing inflation strains on the tire. Thus tire sidewall stiffness is allowed to be varied without effecting long-term tire durability since the insert is positioned axially inwardly of the carcass ply structure and is only exposed to compression forces and not tension forces.

Yet another advantage of the invention is the provision of an elastomeric insert positioned axially inwardly of the carcass ply to reduce the bead tension on the tire which may allow the use of a lighter weight and lower cost bead.

Still other benefits and advantages of the invention will become apparent to those skilled in the are upon a reading and understanding of the following detailed specification.

The invention may take form in certain parts and arrangements of parts, preferred embodiments of which will be described in detail in this specification and illustrated in the accompanying drawings which form a part hereof, and wherein.

Figure 1:
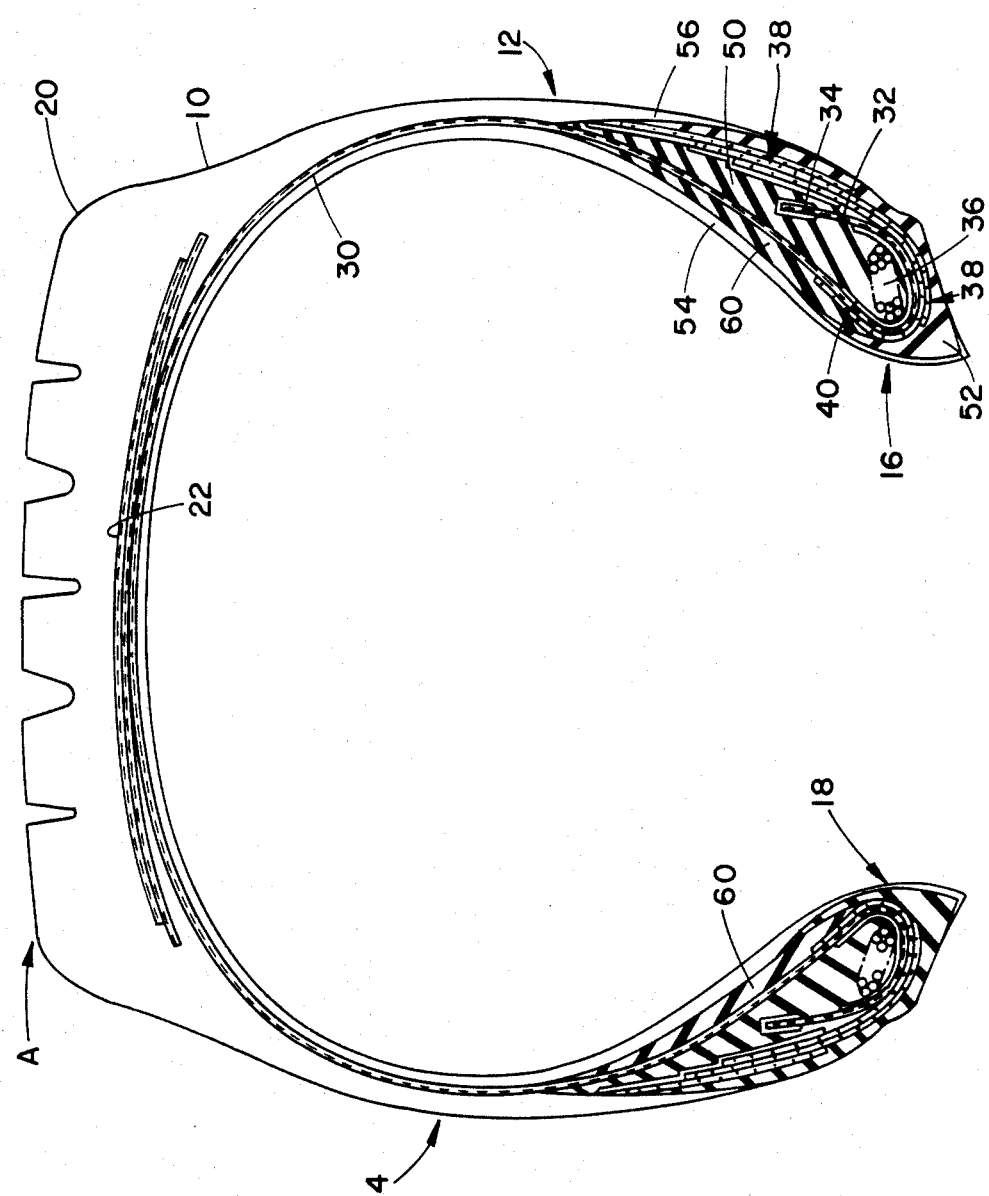
FIG. 1 is a side elevational view in cross section through a tire according to the present invention.

Referring now to the drawings, wherein the showings are for purposes of illustrating preferred embodiments of the invention only and not for purposes of limiting same, FIG. 1 shows the subject new pneumatic tire construction A. While the tire construction is primarily designed for and will hereinafter be described as a pneumatic tire for trucks, it will be appreciated that the overall inventive concept could be adapted for use in low profile tires for various types of vehicles.

More particularly, the tire A includes a crown 10 as well as first and second sidewalls 12, 14 which lead to first and second bead portions 16, 18. A circumferential tread 20 is provided on the crown 10 with a tread reinforcing belt structure 22 being provided below the tread but above a carcass ply 30 of the tire. Although the carcass ply 30 is shown as being of single ply construction, obviously a multi-ply construction can be employed if desired. Preferably, the carcass ply 30 is made of a rubberized ply of steel cord, but it can also be made of non-steel carcass reinforcing material. The tire as shown in FIG. 1 is particularly constructed for a conventional 15° drop-center tubeless rim wheel of the type shown in fragment form in FIG. 3. This is an over-the-road wheel generally used for medium trucks. Such wheels are typically employed on eighteen wheeler trucks, such as semitrailer trucks.

Figure 2:
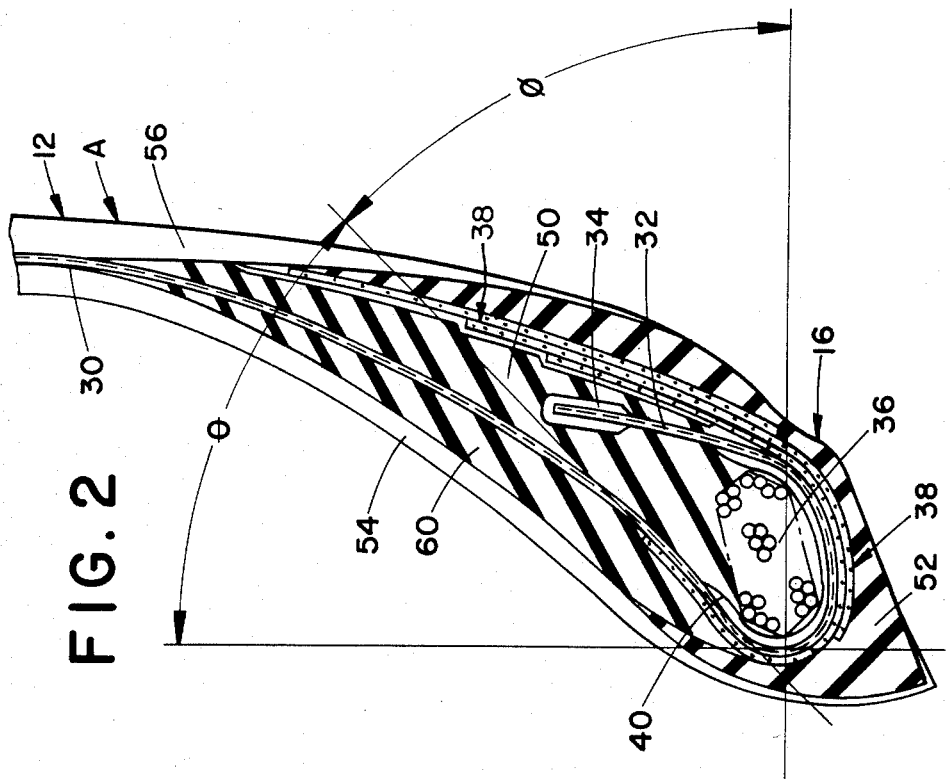
FIG. 2 is an enlarged side elevational view in cross section of a lower sidewall and bead portion area of the tire of FIG. 1.

With reference now also to FIG. 2, the carcass ply 30 has a carcass edge 32 which can terminate in an end structure 34. The carcass edge 32 is looped around a bead reinforcing wire 36 which extends annularly in the bead portion 16 of the tire. One or more chippers, that is, outer reinforcing plies, 38 can be positioned adjacent the carcass ply 30 in the area of the bead wire 36. Also, an inner reinforcing ply 40 can be provided, if desired, between the carcass ply 30 and the bead wire 36.

An annular stiffener 50, having a generally triangular shape, is provided radially outwardly of the bead wire 36 and substantially axially outwardly of the carcass ply 30 for stiffening the sidewall of the tire. The carcass end structure 34 can be embedded in the stiffener 50, if so desired. It should be noted that such an end structure 34 is not always needed sinde the carcass edge 32 can also just be folded around the stiffener 50. Similarly, the bead wire 36 can be embedded in the bottom portion of the stiffener 50 if desired. A gum chafer 52 is provided inwardly of the chipper 38 toward the rotational axis of the tire to prevent chafing of the tire by an adjacent wheel rim portion. A liner ply 54 is provided axially inwardly of the carcass ply 30 and is laminated thereto to produce an air seal on the inside of the tire thereby enabling the tire to be used without an inner tube. An outer sidewall band 56 is provided axially outwardly of the carcass ply 30 and radially outwardly of the gum chafer 52 toward the tire tread 20.

Figure 3:
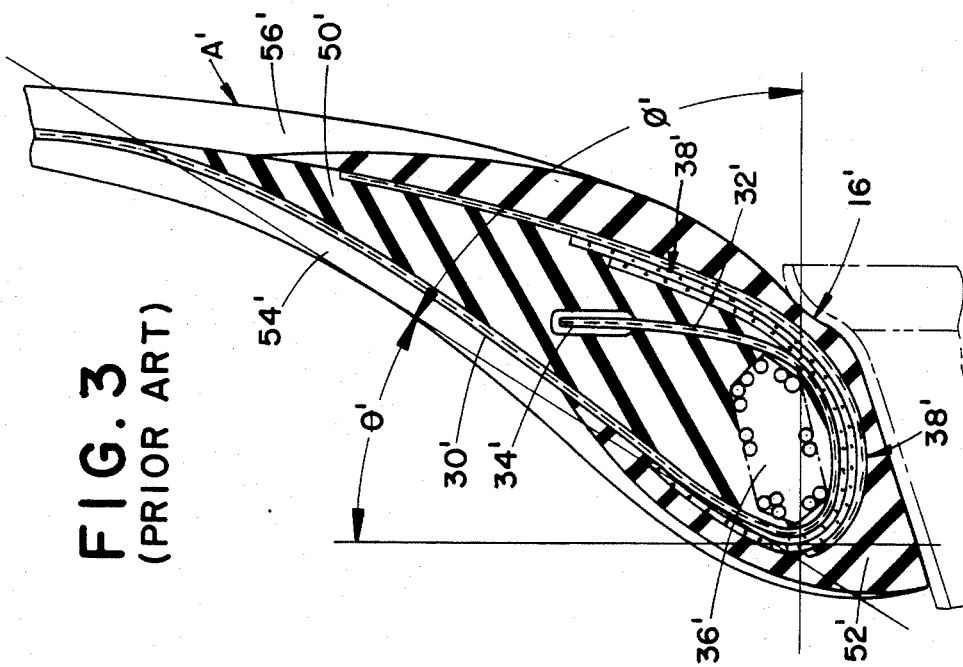
FIG. 3 is a side elevational view in cross section of a lower sidewall and bead portion area of a prior art tire; and, FIG. 4 is a side elevational view in cross section of a lower sidewall and bead portion area of a tire according to a second preferred embodiment of the present invention.

With reference now to the prior art tire sidewall portion as shown in FIG. 3, wherein like components are identified by like numerals with a primed (') suffix, this tire is also provided with a carcass 30' terminating in a carcass edge 32' which ends in an end structure 34'. The carcass edge is looped around an annular bead wire 36' positioned in a tire bead 16'. The tire is also provided with one or more chippers or outer reinforcing plies 38' and inner reinforcing plies 40'. Positioned radially outwardly of the bead wire 36' is a stiffener 50' and the end structure 34' of the carcass edge can be positioned in the stiffener 50'. A gum chafer 52' is provided radially inwardly of the carcass ply 30' toward the rotational axis of the tire. A liner 54' is provided axially inwardly of the carcass ply. An outer sidewall band 56' is positioned axially outwardly of the carcass ply 30' and adjacent the gum chafer 52'.

In the present invention as shown in FIG. 2, however, an elastomeric insert or reinforcing strip 60, which can be of an approximately lenticular shape or another suitable shape, is provided axially inwardly of the carcass ply 30 to allow the ply to better conform to its natural shape upon inflation than can the ply 30' of the prior art tire of FIG. 3. As mentioned, the lowest inflation stress condition is achieved when the carcass ply 30 assumes its natural shape upon inflation. This, however, is difficult to do since the lower sidewall of the tire needs to be reinforced with the stiffener 50 to reduce deflection strains on the tire when it rotates. However, positioning the stiffener 50 axially outwardly of the carcass ply 30 necessitates positioning the ply off its natural shape upon inflation and this increases inflation caused strains in the carcass ply. By positioning the reinforcing strip 60 axially inwardly of the carcass ply 30, the ply is allowed to better conform to its natural shape upon inflation thus reducing inflation strains.

It should be noted that the thickness of the tires, i.e. the gauges, are identical overall in the tires of FIGS. 2 and 3; however, the components are positioned differently. The location of the elastomeric insert or reinforcing strip 60 axially inwardly of the carcass ply 30 in the tire A according to the present invention reduces the inflation strain on the tire. Since the strip 60 keeps the gauge or width of the tire A the same and only repositions some of the stiffener rubber axially inwardly of the carcass ply 30, the deflection strains on the tire are not increased while the inflation strains are decreased.

As is the case with the stiffener 50, the reinforcing strip 60 is annular and extends around the bead 16 of the tire A. Two such strips 60 are provided, one in each bead 16, 18 and extending into the adjacent sidewall 12, 14 as shown in FIG. 1. Preferably, the strip 60 extends radially outwardly from approximately adjacent the bead bundle 36 to a point spaced from a nominal rim diameter of the tire A a distance no greater than approximately 65% of the section height (i.e. the tire outer diameter minus the rim diameter divided by two) of the tire. Preferably, the reinforcing strip 60 extends radially outwardly to a point no greater than approximately 50% of the tire section height. The maximum gauge of the strip 60 can be between 2 to 10% of one-half of the maximum section width of the tire. In one preferred embodiment, the strip 60 is 0.508 cm. in width when the tire bead cross section is 3.175 cm. and the stiffener 50 is 1.27 cm. in width.

It is important to note that the rubber compound of the reinforcing strip 60 can be changed to vary or "tune" the lower sidewall stiffness without any effect on long-term tire durability since the strip is located axially inside the carcass ply 30 and will only be subjected to compression stresses and not tension stresses which cause rubber to fail much faster. Such compression stresses will occur due to bending when the tire is deflected. This type of "tuning" would be particularly advantageous in light truck radial tires and passenger car tires.

Thus, the reinforcing strip 60 can have the same rubber composition as the stiffener 50 or it can have a different rubber composition as desired. The rubber for both the stiffener 50 and the strip 60 preferably has a modulus of approximately 5 to 20 meganewtons/m$^2$ at 300% elongation (a newton is a unit of pressure in the international system of units and is calibrated in m$^{-1}$Kgs$^{-2}$). In one preferred embodiment, the rubber of the reinforcing strip 60 has a modulus of 13.8 meganewtons/m$^2$ at 300% elongation.

Also, if desired, the gauge, i.e. the width, of the tire A may be changed somewhat, again without affecting long-term tire durability since the carcass ply 30 is still maintained in its natural shape when the tire is inflated due to the positioning of the reinforcing strip 60 axially inwardly of the carcass ply.

The angle of approach of the cord to the centerline of the tire near the bead bundle 36, i.e. the angle $\theta$ (theta) in FIG. 2 is more than 40° and preferably approximately 45° whereas it can be seen that the angle of approach $\theta'$ of carcass ply 30' in FIG. 3 is approximately 31.5°. This larger angle of approach $\theta$ in FIG. 2 enables the carcass ply 30 in the tire of the present invention to more nearly approach its natural shape when inflated thereby reducing the inflation strain on the tire. Photoelastic analysis has shown a decrease in inflation strains in a tire constructed according to the present invention.

In the assembly of a tire according to the present invention, which is conventionally done by molding, the reinforcing strip 60 can be applied after the liner 54 and the gum chafer 52 and before the chipper 38 and the carcass ply 30.

With reference now to the second preferred embodiment of FIG. 4, the invention is there shown in a different tire construction. For ease of illustration and appreciation of this embodiment, like components are identified by like numerals with a double primed (") suffix and new components are identified by new numerals.

In this FIGURE, a bead portion 16" of a tire A" is provided with a carcass ply 30" as well as a bead wire 36" and one or more chippers 38". A stiffener 50" is positioned radially outwardly of the bead wire 36" in the bead portion 16". In the embodiment of FIG. 4, however, the gum chafer is combind with the reinforcing strip into a combined chafer and reinforcing strip structure 64. In this way, a single component can serve both functions and no separate reinforcing strip is required.

Of course, if the combined structure 64 is used, then it is extruded as a single component and no additional component is required during the assembly of the tire. The combined structure 64 extends inwardly of the bead wire 36" toward the tire's rotational axis as well as outwardly of the bead wire toward the tire tread along the carcass ply 30" and the chippers 38". That is, the combined structure 64 extends both axially inwardly and axially outwardly of the carcass ply 30". The portion of structure 64 extending axially inwardly of the carcass ply 30" and radially outwardly in the tire from approximately adjacent the bead wire 36" performs the same function as the reinforcing strip 60 of the embodiment of FIGS. 1 and 2, namely, to reduce inflation strains on the tire.

The subject invention thus provides for a tire construction which reduces tire inflation strains by allowing the carcass reinforcing ply of the tire to approach its natural shape upon tire inflation. This is accomplished by positioning an elastomeric insert portion in the tire sidewall axially inwardly of the carcass ply structure from approximately adjacent the bead wire radially outwardly.

The invention has been described with reference to preferred embodiments. Obviously, modifications and alterations will occur to others upon the reading and understanding of this specification. It is intended to include all such modifications and alterations insofar as they come within the appended claims or the equivalents thereof.

Having thus described the invention, it is now claimed:

1. A pneumatic tire comprising:
   a body including a ground-engaging tread portion, a pair of sidewall portions and a pair of bead portions;
   an annular substantially inextensible bead reinforcing member positioned in each of said bead portions;
   a carcass ply positioned in said pair of sidewall portions and said ground-engaging tread portion and extending from one of said bead portions to the other of said bead portions;
   a first elastomer reinforcing member positioned in each bead portion, said first member being disposed axially outwardly of said carcass ply; and,
   a second elastomer reinforcing member positioned in each bead portion, at least a portion of said second member being disposed axially inwardly of said carcass ply as well as an end section of said carcass ply folded around said bead reinforcing member, said second member portion extending radially outwardly from approximately adjacent each bead reinforcing member to a point spaced from the tire nominal rim diameter no higher than 65% of the section height, wherein said carcass ply adjacent said bead reinforcing member is disposed at an angle of not less than approximately 40 degrees to the centerline of the tire due to the positioning of said second elastomer reinforcing member portion axially inwardly of said carcass ply.

2. The tire of clam 1 wherein said second reinforcing member portion extends radially outwardly to a distance no greater than approximately 50% of the tire section height.

3. The tire of claim 1 wherein said second reinforcing member is made of a material having a modulus of between 5 to 20 meganewtons/m$^2$ at 300% elongation.

4. The tire of claim 3 wherein said second reinforcing member is made of material having a modulus of approximately 13.8 meganewtons/m$^2$ at a 300% elongation.

5. The tire of claim 1 wherein said second reinforcing member portion constitutes approximately 2 to 10% of one-half of the maximum section width of the tire.

6. The tire of claim 1 wherein said angle is approximately 45°.

7. The tire of claim 1 wherein said second reinforcing member is lenticular in shape and extends annularly in said bead portion.

8. The tire of claim 7 further comprising a chafer member which extends inwardly from said bead reinforcing member toward the rotational axis of the tire and abuts said second reinforcing member.

9. The tire of claim 1 wherein said second reinforcing member also extends inwardly from said bead reinforcing member toward the rotational axis of the tire.

10. A pneumatic tire comprising:
a ground-engaging tread portion extending about the circumference of the tire and merging into a sidewall portion at each lateral edge, said sidewall portions extending radially inwardly and each terminating in a bead portion;
an annular substantially inextensible bead reinforcing member positioned in each of said bead portions;
a carcass ply extending from one of said bead portions to the other of said bead portions, lateral ends of said carcass ply extending around said pair of bead reinforcing members;
a first elastomer reinforcing member positioned in each bead portion and disposed axially outwardly of said carcass ply and radially outwardly of said bead reinforcing member; and,
a second elastomer reinforcing member positioned in each bead portion, at least a portion of said second member being disposed axially inwardly of said carcass ply, said second member portion extending from about each of said bead reinforcing members radially outwardly to a point spaced from a nominal rim diameter of the tire a distance no greater than approximately 65% of the tire section height, said second member portion constituting approximately 2 to 10% of one-half of the maximum section width of the tire immediately radially outward of said bead reinforcing member so as to increase the angle said carcass ply forms with the centerline of the tire to not less than approximately 40 degrees.

11. The penumatic tire of claim 10 wherein said first reinforcing member is generally triangular in shape and said second reinforcing member is approximately lenticular in shape, each of said members extending annularly in the bead.

12. The pneumatic tire of claim 10 wherein said second reinforcing member is made of a material having a modulus of elasticity of between 5 to 20 maganewtons/m$^2$ at 300% elongation.

13. The pneumatic tire of claim 10 wherein lateral ends of said carcass ply are embedded in a respective one of said first elastomer reinforcing members.

14. The pneumatic tire of claim 10 wherein the cross-sectional thickness of said first reinforcing member is approximately 1.27 cm., the cross-sectional thickness of said bead portion is approximately 3.175 cm. and the cross-sectional thickness of said second reinforcing member is approximately 0.508 cm.

15. The pneumatic tire of claim 14 further comprising a third elastomer reinforcing member which extends from a radially innermost end of each of said bead portions radially outwardly along an exterior surface of the tire and axially outwardly of said carcass ply lateral ends, said third reinforcing member also extending radially inwardly of said bead reinforcing member and abutting said second reinforcing member.

16. The pneumatic tire of claim 10 wherein said second reinforcing member also extends radially inwardly from said bead reinforcing member to constitute a chafer member.

17. The pneumatic tire of claim 10 wherein said carcass ply lateral ends are disposed axially outwardly of at least a portion of said first elastomer reinforcing member.

18. A pneumatic tire comprising:
a body including a ground-engaging tread portion, a pair of sidewall portions and a pair of bead portions;
an annular substantially inextensible bead reinforcing member positioned in each of said bead portions;
an annular first elastomer reinforcing member positioned radially outwardly of said bead reinforcing member and adjacent thereto;
a toroidally-shaped carcass ply, comprising a plurality of cords, positioned in said ground-engaging tread portion and said pair of sidewall portions, said carcass ply having a central portion and a pair of end portions folded around a respective one of said bead reinforcing members; and,
means for enhancing the durability of the tire, said means comprising a second elastomer reinforcing member positioned in each bead portion and disposed axially inwardly of both said carcass ply central portion and said end portions, said second reenforcing member extending radially outwardly from approximately adjacent each bead reinforcing member, and wherein said carcass ply cords in said central portion immediately adjacent said bead reinforcing member are disposed at an angle of not less than approximately 40° to the centerline of the tire due to the positioning of said second elastomer reenforcing member axially inwardly of said carcass ply, wherein said second reinforcing member extends from about said bead reinforcing member radially outwardly to a point spaced from the tire nominal rim diameter a distance no greater than approximately 65% of the tire section height.

19. The tire of claim 18 wherein said second reinforcing member in approximately lenticular in shape.

20. The tire of claim 18 wherein the positioning of said means for reducing inflation strain enables said plurality of cords in said carcass ply, adjacent said bead reinforcing member, to extend at an angle of not less than approximately 45° to the centerline of the tire.

* * * * *